United States Patent
Sangberg

(10) Patent No.: US 7,929,981 B2
(45) Date of Patent: Apr. 19, 2011

(54) SYSTEM AND METHOD FOR IDENTIFIABLE COMMUNICATION CHANNEL SETUP BETWEEN TERMINALS WITHOUT PREVIOUS CONTACT

(75) Inventor: Troed Sangberg, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 602 days.

(21) Appl. No.: 12/104,627

(22) Filed: Apr. 17, 2008

(65) Prior Publication Data
US 2009/0215475 A1 Aug. 27, 2009

Related U.S. Application Data

(60) Provisional application No. 61/031,825, filed on Feb. 27, 2008.

(51) Int. Cl.
H04Q 7/20 (2006.01)
(52) U.S. Cl. .......... 455/466; 455/456.1; 455/418; 342/367; 709/245
(58) Field of Classification Search .......... 455/466, 455/456.1, 418; 342/367; 709/345
See application file for complete search history.

(56) References Cited

U.S. PATENT DOCUMENTS

| | | | |
|---|---|---|---|
| 2002/0084888 A1* | 7/2002 | Jin | 340/7.21 |
| 2002/0168958 A1 | 11/2002 | Ford et al. | |
| 2006/0074769 A1* | 4/2006 | Looney et al. | 705/26 |
| 2006/0212600 A1* | 9/2006 | Hee Jin | 709/245 |
| 2007/0190494 A1* | 8/2007 | Rosenberg | 434/11 |
| 2007/0273583 A1* | 11/2007 | Rosenberg | 342/367 |
| 2009/0197617 A1* | 8/2009 | Jayanthi | 455/456.2 |

FOREIGN PATENT DOCUMENTS

| | | |
|---|---|---|
| EP | 1 513 262 | 3/2005 |
| EP | 1 802 145 | 6/2007 |
| WO | 2006/128667 | 12/2006 |

OTHER PUBLICATIONS

"Specification of the Bluetooth System, Profiles, Version 1.1, Part K:1, Generic Access Profile," XP002313541; Feb. 22, 2001; pp. 13-62.

International Search Report for corresponding application No. PCT/EP2008/061131 dated Dec. 29, 2008.

Written Opinion for corresponding application No. PCT/EP2008/061131 dated Dec. 29, 2008.

* cited by examiner

Primary Examiner — Danh C Le
(74) Attorney, Agent, or Firm — Renner, Otto, Boisselle & Sklar, LLP

(57) ABSTRACT

A method for sending and receiving a virtual "shout" between two mobile terminals is provided. The method includes the steps of detecting mobile terminals in a near area of the sending terminal and presenting the detected terminals on a display on the sending terminal. At least one of the detected terminals may be selected and a "shout" is sent to the selected mobile terminal. The "shout" may be received in the selected mobile terminal and the user a user of the selected receiving terminal may be alerted as indication of a received "shout".

28 Claims, 3 Drawing Sheets

SYSTEM AND METHOD FOR IDENTIFIABLE COMMUNICATION CHANNEL SETUP BETWEEN TERMINALS WITHOUT PREVIOUS CONTACT

CROSS-REFERENCE TO RELATED APPLICATION

This application claims the benefit of U.S. Provisional Application Ser. No. 61/031,825, filed Feb. 27, 2008, the entire disclosure of which is hereby incorporated by reference.

TECHNICAL FIELD

The present invention relates to the field of mobile terminals and, more particularly, to mobile terminals sending messages without previous contact.

RELATED ART

A variety of mobile terminals, such as mobile telephones, PDAs, media players and/or handheld computers, are widely used today. Augmented hearing devices, such as headphones, outer ear plugs, in-canal ear plugs, sound-through ear plugs among others, are commonly used together with these mobile terminals.

Today many users wear headphones or ear plugs when listening to e.g. music, radio or sound books for a large part of their outdoor life. Additionally, since almost every mobile terminal includes a music player this is becoming even more common.

Several of today's hearing devices blocks out external sound and surrounding noise to a varying extent. In some situations blocking is desired, typically when listening to music and the surrounding noise is disturbing the listener/user. In other situations it may be important to get in contact with the listener/user.

Today's hearing devices are static, i.e. either the hearing devices permits leakage of surrounding sounds or not. While the listener indeed is cut off from a lot of unwanted noise or distractions, the listener are not able to select what to listen to. This may be an important function in society, i.e. when a police car with sirens is trying to get you to move at the traffic lights so that they can pass, friends who is trying to get in contact with the listener/user or someone else who wants to get the listeners/users attention, such as when the listener/user have dropped a wallet or keys.

SUMMARY OF THE INVENTION

With the above and following description in mind, then, an aspect of the present invention is to provide a method, terminal and a system for sending shout messages between mobile terminals without previous contact which seeks to mitigate, alleviate, or eliminate one or more of the above-identified deficiencies in the art and disadvantages singly or in any combination.

An aspect of the present invention relates to a method for sending and receiving shout messages between a sending terminal and at least one receiving terminal. The method comprises the steps of detecting receiving terminals in a near area of the sending terminal, presenting the detected receiving terminals on a display on the sending terminal, selecting at least one of the receiving terminals and sending a shout message and identification data of the sending terminal to the at least one selected receiving terminal. The method further comprises the steps of receiving the shout message and identification data in the at least one selected receiving terminal and alerting a user of said receiving terminal indicating said received shout message.

The method may also comprise the steps of comparing received identification data with stored identification data in an authorization list within the receiving terminal, determining based on the comparison, if an alert signal is to be transmitted to the user of the receiving terminal and transmitting an alert signal to the user of said receiving terminal.

In one embodiment, the alert signal may be a vibration signal, an audio stream, a video stream or a combination of the same.

In one embodiment, the receiving terminal may comprise a hearing impairing device and the alert signal may be an audio stream transmitted to the hearing impairing device.

In one embodiment may the receiving terminal comprise a multimedia device and that the alert signal may be a video stream transmitted to the multimedia device.

In one embodiment the presentation step of the method may further comprise the step of presenting the detected receiving terminals on a location map covering the near area. The location map may be downloaded from an external database.

In one embodiment, the detected receiving terminals may be marked in a predetermined way if the terminal is within the authorization list.

In one embodiment may the user of the receiving terminal be able to modify the authorization list.

In one embodiment, the authorization list may be preset by a manufactory.

In one embodiment, the method may further comprise the steps of sending a reply message from the receiving terminal to said sending terminal. The reply message may be a predetermined message.

In one embodiment, the shout message may be a predetermined shout message.

Another aspect of the present invention relates to a communication terminal comprising means for receiving shout messages with identification data, means for sending shout messages with identification data, means for detecting other communication terminals in a near area of said terminal, means for presenting said detected other communication terminals on a display of said terminal and means for selecting at least one of said other terminals. Further on the terminal comprises means for alerting a user of the terminal indicating a received shout message from any one of the other terminals.

In one embodiment, the terminal may further comprise means for comparing received identification data with stored identification data in an authorization list within the terminal, means for determining based on said comparison, if an alert signal is to be transmitted to said user of said terminal and means for transmitting an alert signal to said user of said terminal.

In one embodiment, the alert signal may be a vibration signal, an audio stream, a video stream or a combination of the same.

In one embodiment, the terminal may comprise a hearing impairing device and that the alert signal may be an audio stream transmitted to the hearing impairing device.

In one embodiment, the terminal may comprise a multimedia device and that the alert signal may be a video stream transmitted to the multimedia device.

In one embodiment, the means for presenting further comprises means for presenting the detected other terminals on a location map covering the near area. The terminal may also comprise means for downloading said location map from an external database.

In one embodiment, the terminal may comprise means for marking the detected other terminals in a predetermined way if the other terminals are within the authorization list.

In one embodiment, the terminal according may comprise means for modifying the authorization list by the user of the terminal.

In one embodiment, the authorization list may be preset by a manufactory.

In one embodiment, the terminal may further comprise means for sending a reply message from the terminal to the other terminals. The reply message may be a predetermined message.

In one embodiment, the shout message may be a predetermined shout message.

Another aspect of the present invention relates to a system for sending and receiving a shout message between at least two mobile terminals.

In one embodiment, the system may further comprise a communication link to an external database.

The features of the above-mentioned embodiments can be combined in any combinations.

In the future augmentation, in form of headphones and video glasses, will become very common. Thus, some embodiments of the invention provide a method for sending shout messages and alerting users of mobile phones with augmentation devices. It is an advantage with some embodiments of the invention that only identified and authorized audio or video streams are permitted to disturb or interrupt the user of the mobile phone.

BRIEF DESCRIPTION OF THE DRAWINGS

Further objects, features and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention relate, in general, to the field of mobile terminals including hearing or visualizing devices. A preferred embodiment relates to a mobile terminal, such as a mobile phone, including an augmented hearing or visualizing device adapted for identifying and authorizing shout messages. However, although the invention is particularly suitable for mobile phones, it is as such equally applicable to other electronic devices which include radio communication capabilities. However, for the sake of clarity and simplicity, the embodiments outlined herein are related to mobile phones.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to persons skilled in the art. Like reference signs refer to like elements throughout.

A way of getting in contact with a specific person is to shout to that specific person. If a user of a mobile phone wants to shout to another user of another mobile phone to far away or who is wearing hearing devices, the first user, the sending user, may send a virtual shout, a shout message, to the second user, the receiving user. The receiving user may allow or block the received shout message sent from the sending user. The technical solution to achieve this is dependent on several technologies working together.

Figure 1:
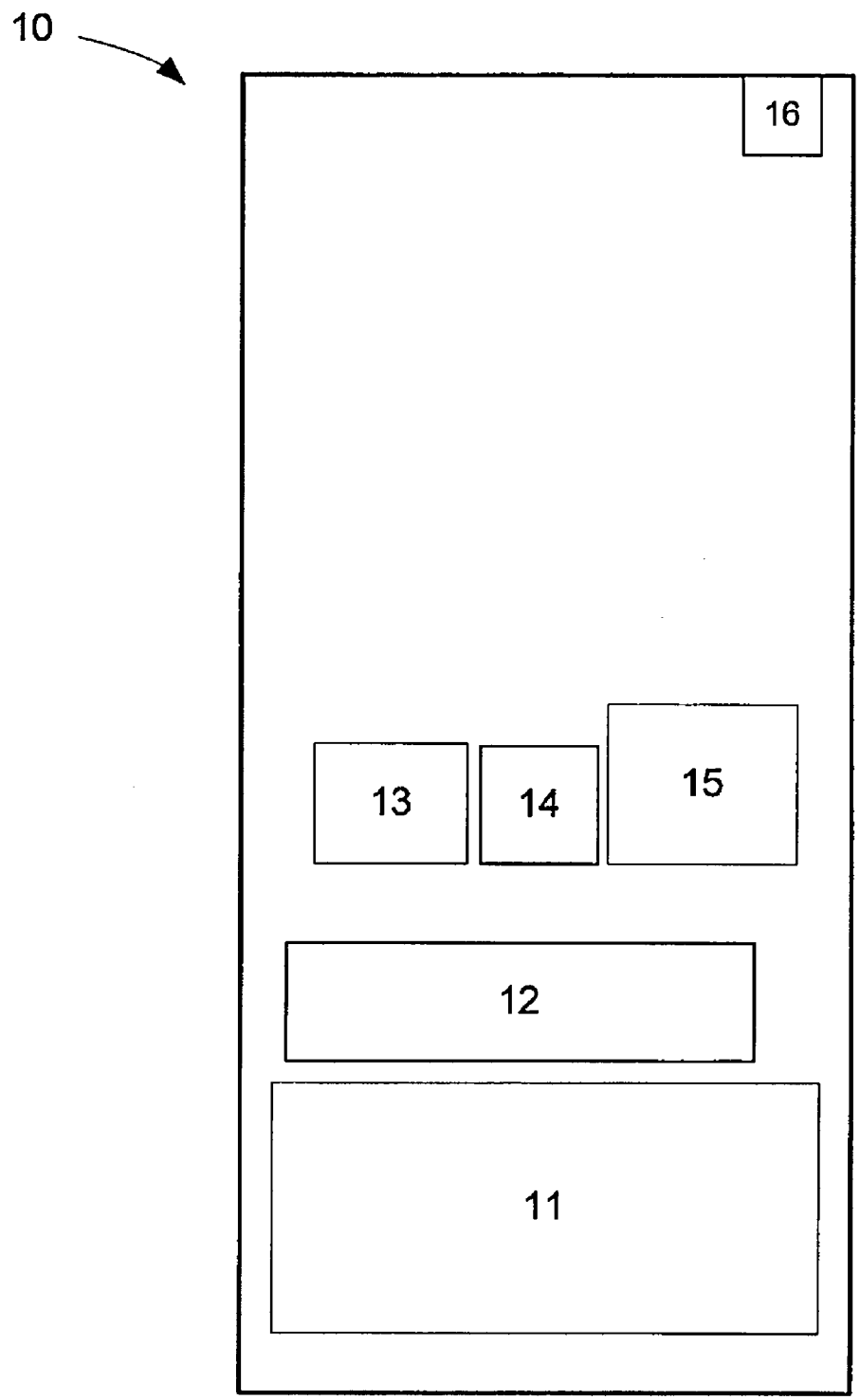
FIG. 1 is a schematically view of a mobile terminal equipped with a shout message system according to one embodiment of the invention.

FIG. 1 shows schematically a mobile phone 10 according to the invention comprising a shout message receiving unit 11, a shout message sending unit 12 and a detecting unit 13 adapted for detecting other mobile phones in a near area of the mobile phone. Further the mobile phone comprises a unit for presenting 14 other detected mobile phones on a display 22 of the mobile phone 10, a unit adapted for selecting 15 at least one mobile phone to send a shout message to and a unit for alerting 16 the user of the mobile phone when receiving a shout message. The mobile phone according to the invention is adapted for receiving and sending shout messages with identification data comprising e.g. ID number of the mobile phone, name and address of the user, a picture of the user etc. The mobile phone is further adapted for identifying, based on received identification data, if the sending mobile phone is authorized for alerting the user of the receiving mobile phone indicating a received shout message.

Figure 2:
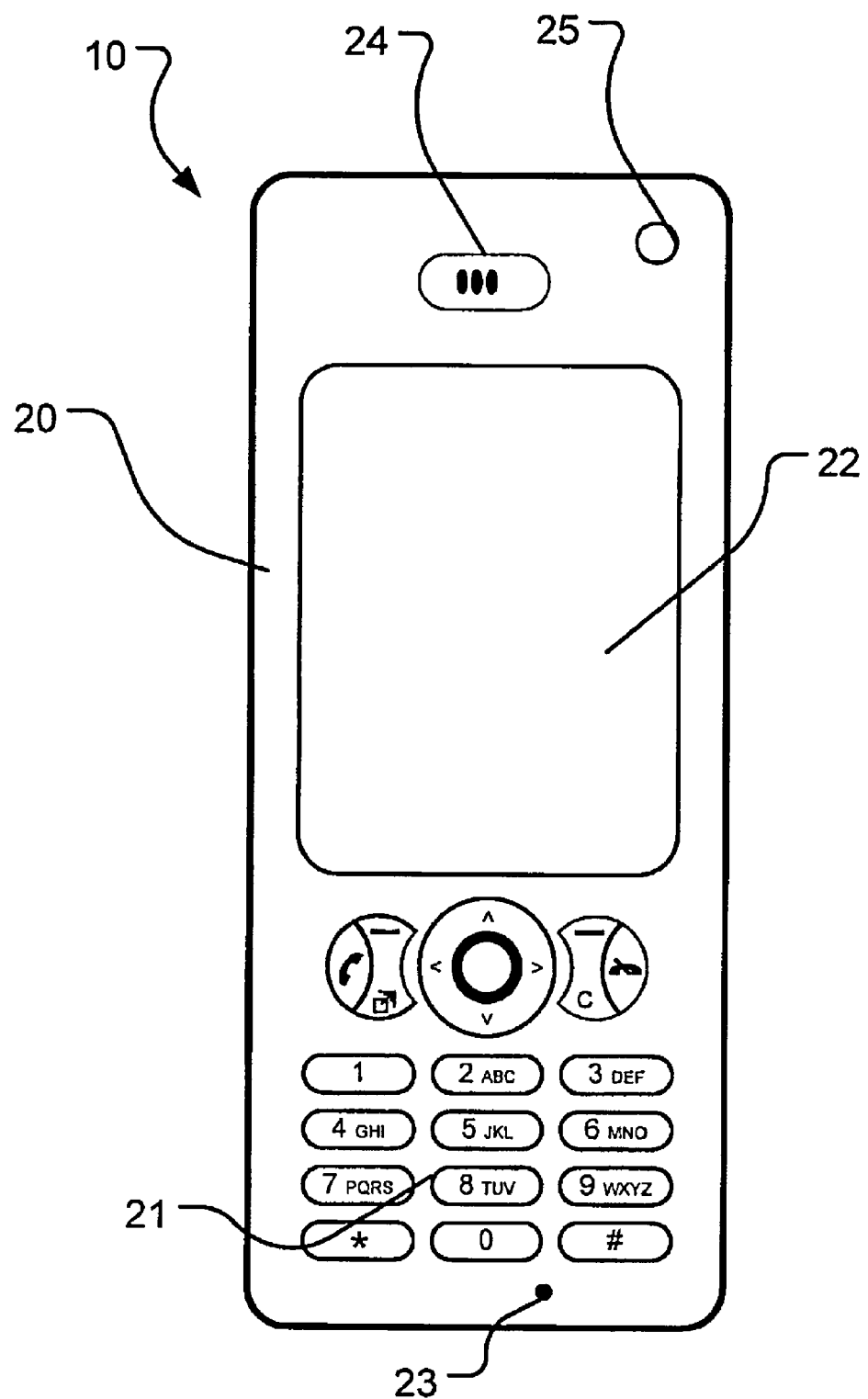
FIG. 2 is a view of a mobile phone according to the invention.

The mobile phone 10 according to the invention may also comprise a housing 20, a keypad or keyboard 21 and a display 22, as shown in FIG. 2. Typically, the mobile phone 10 also includes a microphone 23 and a speaker 24. The mobile phone may also comprise radio transceiver circuitry and antenna 25. The specific function and design of the mobile phone 10 as a communication device is known to persons skilled in the art, and will therefore not be described in any greater detail herein. It should also be noted that the list of features and elements included in the mobile phone 10 is in no way exhaustive. On the contrary, while the mobile phone 10 shown and described represents only one possible embodiment, it may as well comprise further features and elements providing other functions. Also, it should be appreciated that some of the elements listed above are not of importance for the invention as such and can be dispensed within other embodiments.

As is known, a mobile phone may be used with augmented hearing device, such as ear plugs, to improve the hearing and freeing the hands for i.e. driving. Also, mobile phones of today often incorporate media players for audio and video. The hearing device may be connected by means of a cord or by means of short range radio communication, i.e. Bluetooth®, WLAN, NFC, to the mobile phone.

As an example, the near area of a mobile phone may be defined as the area in the line of sight, that is, the area where the user may be able to see other users of mobile phones. The near area may also be defined as the area within 1 meter, 10 meter or 100 meter. The definition of the near area should be regarded as illustrative rather than restrictive, and not as being limited to the particular embodiments discussed above.

In one embodiment of the present invention a user of a mobile phone decides to send a virtual "shout" to another user of a mobile phone. The sending mobile phone starts scanning the near area for appropriate mobile phones to send a shout message to. A virtual "line of sight" is created based either on contact methods with a short communication range and in some cases longer communication range where positioning through GPS/AGPS together with long-range radio technology like UMTS is used, within which a user may send a shout message to another user. This is different from calling someone or from using any PTT-related technology (Push-to-talk technology), in that it may be possible to reach, "shout", to anyone the user can "see" or identify in the line of sight, even if the user have never been in contact with them before and they do not have to exist on the contact list of the mobile phone.

The detected mobile phones, within the "line of sight", are then presented on a display on the sending mobile phone. The user selects at least one mobile phone to send a shout message to among the presented mobile phones. The user sends a shout message together with identification data of the sending mobile phone to the selected mobile phone/s. The receiving mobile phone receives the shout message with the identification data and determines, based on the received identification data, within said receiving terminal, if the identification data of the sending mobile phone is within an authorization list in the receiving terminal. If the identification data is within the authorization list authorized an alert signal is sent to the user of the receiving terminal indicating a received shout message. If the identification data is not within the authorization list, an alert signal is not sent.

If the user uses augmented hearing devices or impaired hearing devices the alert signal may be transmitted through the hearing device and alerting the user that a shout message has been sent. The alert signal may be a vibration signal, an audio stream, a video stream or a combination of two or all.

The shout message may be a predetermined message such as, Help!, Move!, Stop! etc. or a personally created message.

A shout message may be sent without expecting or wanting an answer, i.e. by the police, offers from a store etc. Additionally, the receiving mobile phone may send an answer message to the sending mobile phone. The answer message may be a predetermined message, such as Thanks!, Bye!, Go away! etc or a personally created message.

Figure 3:
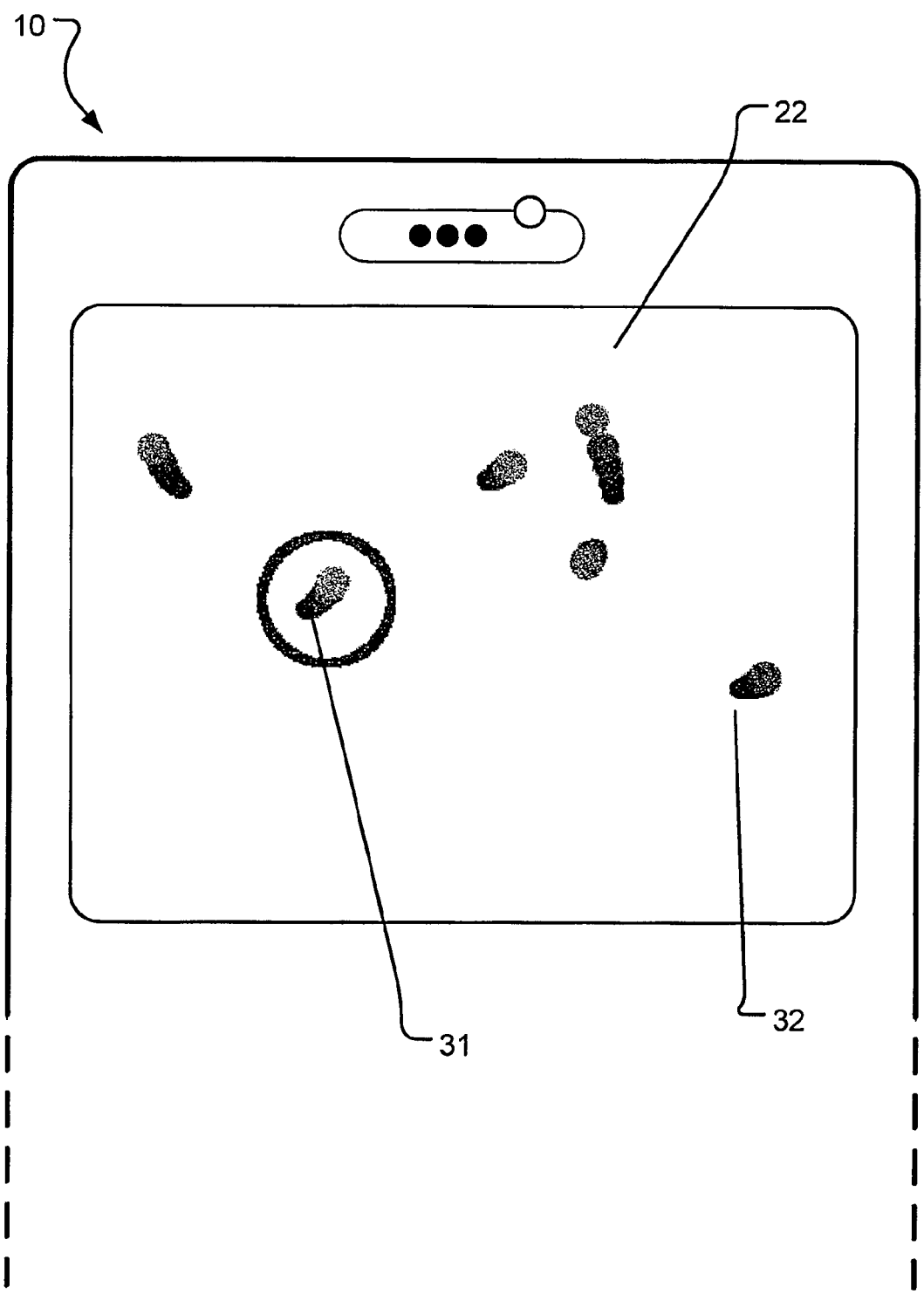
FIG. 3 is a view of the display of the mobile phone in FIG. 2 showing a location map according to the invention.

In one embodiment of the present invention the detected mobile phones may be presented in a simple list or as markers on a location map covering the near area of the sending mobile phone, shown on the display 22, as shown in FIG. 3. On the location map the user may select whom the user wants to "shout" to. FIG. 3 shows a location map or a User Interface, UI, showing the position of available mobile phones 31, 32 and how their movement may look. "Shouting" or sending a shout message to someone would be done by selecting one of them 31 on the location map shown on the interface of the mobile phone. The location map may also be downloaded from an external database. If some of the detected mobile phones is known, that is the user of the mobile phone is identified and is in the contact list of the sending mobile phone, the mobile phone markers may be marked in a specific way, e.g. the marker may have a different colour or may be marked by a circle.

In another embodiment of the present invention, the detecting unit 13 of the mobile phone may continuously be searching for available receiving mobile phones and presenting the detected mobile phones on the list or the location map. The user of the searching mobile phone may choose a mobile phone to send a shout message to by marking the chosen mobile phone 31 in the list or on the location map. The marking may be adapted in several different ways, such as by a surrounding circle, another color or others. The user of the sender mobile phone may also choose to send a shout message to a whole group of receiving mobile phones, and then the whole group will be marked.

It may also be possible to have a UI not only on the phone, but in VR-glasses as well, where the selection part comprising pointing to someone, who is using a mobile phone, using the hand, tracking the movement of a wrist watch, or a ring or others, and sending a shout message to the selected mobile phone.

The authorization list of the receiving mobile phone may include identification data of all mobile terminals the user of the mobile phone wants to trigger a transmission of an alert signal indicating a shout message from the mobile terminal.

If the identification data of a sending mobile phone is unknown, that is if the identification data of the sending mobile phone is unknown, an alert signal may be transmitted if the user of the receiving mobile terminal has included unknown in the authorization data. If the identification of the sending mobile phone is in the authorization list, the sending mobile phone is identified as authorized and an alert signal is transmitted to the user of the receiving mobile phone when indicating a shout message from that mobile terminal. If the identification data of the sending mobile phone is not in authorization list, the sending mobile phone is identified as unauthorized and no alert signal is transmitted. The receiving mobile phone may be warned when unauthorized sending mobile phones sends shout messages. The user of the receiving mobile terminal may modify the authorization list in the receiving mobile terminal by adding or deleting identification data of users dependent on if the user wants to allow or block an alert signal to be transmitted when the sending user sends shout message. The authorization list may be preset by a manufacturer. As an example, authorization list may include the police as preset identification data.

A simple list of identification data of users who have sent a shout message before may exist as a shout history list. The user of the receiving mobile terminal may modify the authorization list in the receiving mobile terminal by adding identification data of users dependent on if the user wants to allow an alert signal to be transmitted when the sending user sends another shout message.

In another embodiment users may have mobile phones with Bluetooth®, running a supporting application that connects to a server on the internet with their Bluetooth MAC address as id. The sending mobile phone detects other mobile phones nearby using JSR-82 (Java Specification Request) and keeps a simple "quick contacts" list in the phone. When a contact in the quick contact list is selected, a real time audio stream is set up over the internet between the sending mobile phone and the selected receiving mobile phone and the audio stream is transferred between the mobile phones. At the same time, the Bluetooth MAC address of the sending mobile phone may be transferred as identification data and thus authorization may be controlled, based on the Bluetooth MAC address.

One advantage of using the Internet for transferring the actual audio stream is that sending a shout message to a group of mobile phones is easy to add, since it just consist of selecting the entire quick contact list of mobile phones which will receive the same audio stream.

In yet another embodiment, position technology is used in the sending mobile phone as well as stereo sound capability in the receiving mobile phone. The position of the sending mobile phone may then be mapped into a 3D sound position when the shout is played on the receiving mobile phone to help the user of the receiving mobile phone in detecting where the sending mobile phone is located.

The invention may be implemented by suitable combinations of software and hardware as is known in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for sending and receiving shout messages between a sending terminal and at least one receiving terminal, wherein said method comprising the steps of:
    detecting receiving terminals in a near area of said sending terminal;
    presenting said detected receiving terminals on a display on said sending terminal;
    selecting at least one of said receiving terminals;
    sending a shout message and identification data of said sending terminal to said at least one selected receiving terminal;
    receiving said shout message and identification data in said at least one selected receiving terminal; and
    alerting a user of said receiving terminal indicating said received shout message.

2. The method according to claim 1, wherein said method further comprising the steps of:
    comparing received identification data with stored identification data in an authorization list within said receiving terminal
    determining based on said comparison, if an alert signal is to be transmitted to said user of said receiving terminal: and
    transmitting an alert signal to said user of said receiving terminal.

3. The method according to claim 2, wherein said alert signal is a vibration signal, an audio stream, a video stream or a combination of the same.

4. The method according to claim 2, wherein said detected receiving terminals is marked in a predetermined way if said terminal is within said authorization list.

5. The method according to claim 2, wherein said user of said receiving terminal is able to modify said authorization list.

6. The method according to claim 2, wherein said authorization list is preset by a manufactory.

7. The method according to claim 1, wherein said receiving terminal comprises a hearing impairing device and that said alerting step comprises transmitting an audio stream to said hearing impairing device.

8. The method according to claim 1, wherein said receiving terminal comprises a multimedia device and that said alerting step comprises transmitting a video stream to said multimedia device.

9. The method according to claim 1, wherein the presentation step further comprising presenting said detected receiving terminals on a location map covering said near area.

10. The method according to claim 9, wherein said location map is downloaded from an external database.

11. The method according to claim 1, further comprising the steps of:
    sending an reply message from said receiving terminal to said sending terminal.

12. The method according to claim 11, wherein said reply message is a predetermined message.

13. The method according to claim 1, wherein said shout message is a predetermined shout message.

14. A system for sending and receiving a shout message between at least two mobile terminals, according to claim 1.

15. The system according to claim 14, further comprising a communication link to an external database.

16. A communication terminal comprising,
    means for receiving shout messages with identification data;
    means for sending shout messages with identification data;
    means for detecting other communication terminals in a near area of said terminal;
    means for presenting said detected other communication terminals on a display of said terminal; and
    means for selecting at least one of said other terminals,
    wherein said terminal further comprising means for alerting a user of said terminal indicating a received shout message from any one of said other terminals.

17. The terminal according to claim 16, wherein said terminal further comprising:
    means for comparing received identification data with stored identification data in an authorization list within said terminal;
    means for determining based on said comparison, if an alert signal is to be transmitted to said user of said terminal; and
    means for transmitting an alert signal to said user of said terminal and thus alerting said user.

18. The terminal according to claim 17, wherein said alert signal is a vibration signal, an audio stream, a video stream or a combination of the same.

19. The terminal according to claim 17, further comprising means for marking said detected other terminals in a predetermined way if said other terminals are within said authorization list.

20. The terminal according to claim 17, further comprising means for modifying said authorization list by said user of said terminal.

21. The terminal according to claim 20, wherein said authorization list is preset by a manufactory.

22. The terminal according to claim 16, wherein said terminal further comprising a hearing impairing device and that said means for alerting is means for transmitting an audio stream to said hearing impairing device.

23. The terminal according to claim 16, wherein said terminal further comprises a multimedia device and that said means for alerting is means for transmitting a video stream to said multimedia device.

24. The terminal according to claim 16, wherein said means for presenting further comprising means for presenting said detected other terminals on a location map covering said near area.

25. The terminal according to claim 24, further comprising means for downloading said location map from an external database.

26. The terminal according to claim 16, further comprising means for sending a reply message from said terminal to said other terminals.

27. The terminal according to claim 26, wherein said reply message is a predetermined message.

28. The terminal according to claim 16, wherein said shout message is a predetermined shout message.

* * * * *